(12) United States Patent
Doi et al.

(10) Patent No.: US 10,316,156 B2
(45) Date of Patent: Jun. 11, 2019

(54) FOAMED SHEET

(71) Applicant: NITTO DENKO CORPORATION, Ibaraki-shi, Osaka (JP)

(72) Inventors: Kohei Doi, Ibaraki (JP); Kazumichi Kato, Ibaraki (JP); Hideyuki Tokuyama, Ibaraki (JP); Tadao Takahashi, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 43 days.

(21) Appl. No.: 15/101,555

(22) PCT Filed: Sep. 18, 2015

(86) PCT No.: PCT/JP2015/076730
§ 371 (c)(1),
(2) Date: Jun. 3, 2016

(87) PCT Pub. No.: WO2016/047612
PCT Pub. Date: Mar. 31, 2016

(65) Prior Publication Data
US 2016/0304680 A1    Oct. 20, 2016

(30) Foreign Application Priority Data

Sep. 24, 2014  (JP) ................................ 2014-193576
Sep. 24, 2014  (JP) ................................ 2014-193577
Sep. 24, 2014  (JP) ................................ 2014-193578

(51) Int. Cl.
| | |
|---|---|
| B32B 5/18 | (2006.01) |
| C08J 5/18 | (2006.01) |
| C08J 9/00 | (2006.01) |
| C08J 9/12 | (2006.01) |
| C08J 9/30 | (2006.01) |
| C08J 9/36 | (2006.01) |
| C09J 7/26 | (2018.01) |
| B32B 27/06 | (2006.01) |
| B32B 27/28 | (2006.01) |
| C09J 201/00 | (2006.01) |

(52) U.S. Cl.
CPC .............. *C08J 5/18* (2013.01); *B32B 5/18* (2013.01); *B32B 27/065* (2013.01); *B32B 27/283* (2013.01); *C08J 9/0061* (2013.01); *C08J 9/12* (2013.01); *C08J 9/30* (2013.01); *C08J 9/365* (2013.01); *C09J 7/26* (2018.01); *C09J 201/00* (2013.01); *B32B 2266/025* (2013.01); *B32B 2266/0278* (2013.01); *B32B 2266/08* (2013.01); *B32B 2305/022* (2013.01); *B32B 2307/306* (2013.01); *B32B 2307/308* (2013.01); *B32B 2307/558* (2013.01); *B32B 2309/02* (2013.01); *B32B 2309/04* (2013.01); *B32B 2405/00* (2013.01); *B32B 2457/20* (2013.01); *C08J 2201/026* (2013.01); *C08J 2205/044* (2013.01); *C08J 2205/05* (2013.01); *C08J 2205/06* (2013.01); *C08J 2207/00* (2013.01); *C08J 2333/06* (2013.01); *C08J 2333/08* (2013.01); *C08J 2433/08* (2013.01); *C08J 2491/00* (2013.01); *C09J 2201/606* (2013.01); *C09J 2201/622* (2013.01); *C09J 2203/318* (2013.01); *C09J 2203/326* (2013.01); *C09J 2205/114* (2013.01); *C09J 2400/24* (2013.01); *C09J 2423/046* (2013.01); *C09J 2433/00* (2013.01); *C09J 2433/006* (2013.01); *C09J 2475/006* (2013.01); *G02F 2201/503* (2013.01)

(58) Field of Classification Search
CPC ....... C08J 9/365; C08J 9/0061; B32B 27/065; B32B 27/283; C09J 201/00; C09J 7/0289
See application file for complete search history.

(56) References Cited

U.S. PATENT DOCUMENTS

| | | | | |
|---|---|---|---|---|
| 4,499,210 A | * | 2/1985 | Senuma ................ | C08F 255/00 521/139 |
| 9,624,336 B2 | * | 4/2017 | Oyaizu .............. | C08G 18/4244 |

(Continued)

FOREIGN PATENT DOCUMENTS

| | | |
|---|---|---|
| GB | 1 113 921 A | 5/1968 |
| JP | 44-007522 B1 | 4/1969 |

(Continued)

OTHER PUBLICATIONS

Translation of JP 2004/211005, Shimura et al., Jul. 29, 2004, p. 1-20. (Year: 2004).*

(Continued)

*Primary Examiner* — Hai Vo
(74) *Attorney, Agent, or Firm* — Sughrue Mion, PLLC

(57) ABSTRACT

There is provided a foamed sheet which takes only a short time to recover the thickness thereof after being compressed, and even if being subjected to repeated impacts, hardly decreases in the impact absorption. The foamed sheet according to the present invention comprises a foamed body formed of a resin composition comprising: a thermoplastic resin a and a silicone-based compound b having not more than 2,000 siloxane bonds; and/or a thermoplastic resin a' having a silicone chain having not more than 2,000 siloxane bonds. The thermoplastic resin a is preferably at least one selected from the group consisting of acrylic polymers, rubbers, urethanic polymers and ethylene-vinyl acetate copolymers. The silicone-based compound b is preferably at least one selected from the group consisting of silicone oils, modified silicone oils and silicone resins.

18 Claims, 1 Drawing Sheet

(56) References Cited

U.S. PATENT DOCUMENTS

| | | | |
|---|---|---|---|
| 9,902,878 B2* | 2/2018 | Yamamoto | C09J 7/38 |
| 2004/0220289 A1* | 11/2004 | Saito | C08J 9/122 |
| | | | 521/50 |
| 2005/0031858 A1 | 2/2005 | Tachibana | |
| 2013/0079696 A1* | 3/2013 | Patel | A61F 13/0246 |
| | | | 602/56 |
| 2013/0302590 A1* | 11/2013 | Hatanaka | C09J 7/0289 |
| | | | 428/317.7 |
| 2014/0155507 A1 | 6/2014 | Kanada et al. | |
| 2014/0170406 A1 | 6/2014 | Yasuda et al. | |
| 2015/0140315 A1 | 5/2015 | Kato et al. | |
| 2017/0044404 A1* | 2/2017 | Yamamoto | B32B 7/06 |

FOREIGN PATENT DOCUMENTS

| | | | | |
|---|---|---|---|---|
| JP | 01-093353 A | 4/1989 | | |
| JP | 01-259043 A | 10/1989 | | |
| JP | 2001-100216 A | 4/2001 | | |
| JP | 2002-309198 A | 10/2002 | | |
| JP | 2004211005 A | * 7/2004 | | |
| JP | 2006-104251 A | 4/2006 | | |
| JP | 2010-084798 A | 4/2010 | | |
| JP | 2013-001891 A | 1/2013 | | |
| JP | 2014-005444 A | 1/2014 | | |
| WO | WO-2012102112 A1 | * 8/2012 | | C09J 7/0289 |
| WO | WO-2013015245 A1 | * 1/2013 | | C08G 18/6629 |
| WO | 2013/018582 A1 | 2/2013 | | |

OTHER PUBLICATIONS

International Search Report of PCT/JP2015/076730 dated Dec. 22, 2015 [PCT/ISA/210].

International Search Report of PCT/JP2015/076729 dated Dec. 22, 2015 [PCT/ISA/210].

* cited by examiner

[Fig. 1]
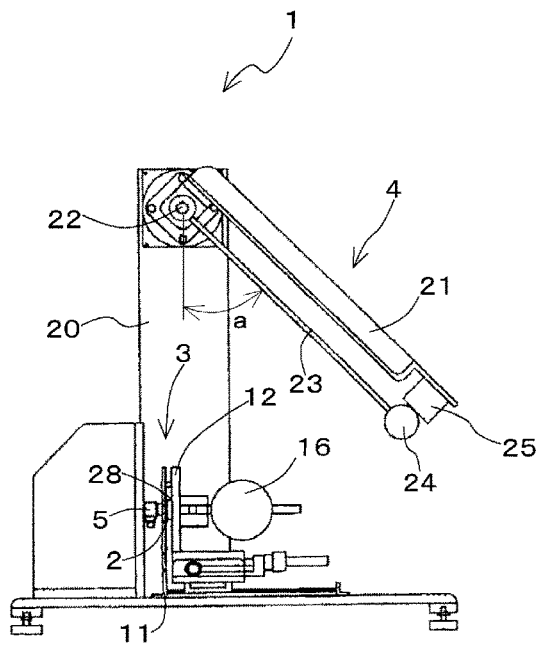
[Fig. 2]
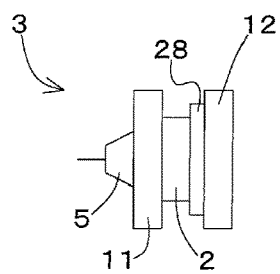
[Fig. 3]
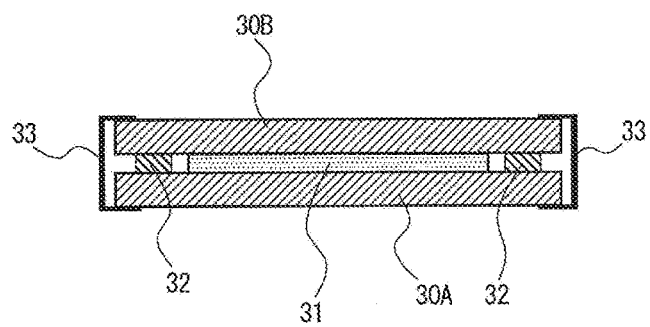

FOAMED SHEET

CROSS REFERENCE TO RELATED APPLICATIONS

This application is a National Stage of International Application No. PCT/JP2015/076730, filed Sep. 18, 2015, claiming priorities based on Japanese Patent Application Nos. 2014-193576, 2014-193577 and 2014-193578, filed Sep. 24, 2014 respectively, the contents of all of which are incorporated herein by reference in their entirety.

TECHNICAL FIELD

The present invention relates to a foamed sheet which, even if being subjected to repeated impacts, exhibits excellent impact absorption, and to an electric or electronic device using the foamed sheet.

BACKGROUND ART

There are conventionally used foamed materials when optical members such as image display members fixed on image display apparatuses such as liquid crystal displays, electroluminescence displays and plasma displays, display members installed on so-called "cellular phones," "smartphones" and "personal digital assistants," cameras and lenses are fixed on predetermined sites (for example, housings). As such foamed materials, there have been used compression-molded high-density fine-cell urethanic foamed bodies having a closed cell structure and low-density urethane and besides, polyethylenic foamed bodies having closed cells and an expansion ratio of about 30, and the like. Specifically, there are used, for example, a gasket (see Patent Literature 1) composed of a polyurethanic foamed body having an apparent density of 0.3 to 0.5 g/cm$^3$, and a sealing material for electric or electronic devices (see Patent Literature 2) composed of a foamed structural body having an average cell diameter of 1 to 500 μm.

In recent years, however, along with more and more thickness reduction of products installed with optical members (image display apparatuses, cameras, lenses and the like), the clearance of portions where foamed materials are used is likely to be remarkably reduced. Along with the clearance reduction, the thickness of the foamed members needs to be made small, but conventional foamed materials, when being made small in thickness, does not exhibit sufficient impact absorption. Hence, for example, in the case where electric or electronic devices with a display member, such as "smartphones," are dropped on the ground or the like, foamed sheets are demanded which absorb impacts on collision, and prevent breakage of the display members.

Further along with the function enhancement of electronic devices such as PCs (personal computers), tablet PCs, PDAs (personal digital assistants) and cellular phones, on impact absorption sheets to be used for the breakage prevention of display members and the like, other members (for example, a thermoconductive layer) are laminated and incorporated. Along with the further thickness reduction of the electronic devices in recent years, there has been demanded further thickness reduction of members such as impact absorption sheets to be used therefor, and there has been demanded the thickness reduction or the elimination of a pressure-sensitive adhesive or adhesive layer in lamination of the impact absorption sheet with another member.

CITATION LIST

Patent Literature

Patent Literature 1: Japanese Patent Laid-Open No. 2001-100216
Patent Literature 2: Japanese Patent Laid-Open No. 2002-309198

SUMMARY OF INVENTION

Technical Problem

Further, studies by the present inventors have revealed that conventional foamed sheets which, even if being comparatively high in initial impact absorption, take much time to recover their original thickness after being compressed have a problem which is that the impact absorption is liable to decrease in the case where the foamed sheets are subjected to repeated impacts.

Therefore, an object of the present invention is to provide a foamed sheet which takes only a short time to recover its thickness after being compressed, and even if being subjected to repeated impacts, hardly decreases in the impact absorption, and an electric or electronic device using such a foamed sheet.

Solution to Problem

As a result of exhaustive studies to achieve the above object, the present inventors have found that when a foamed sheet is formed of a resin composition comprising a specific silicone-based compound and/or a specific thermoplastic resin having a silicone chain, its thickness recovers in a short time after the foamed sheet is compressed, and the foamed sheet, even if being subjected to repeated impacts, hardly decreases in the impact absorption; and have completed the present invention.

That is, the present invention provides a foamed sheet comprising a foamed body formed of a resin composition comprising: a thermoplastic resin a and a silicone-based compound b having not more than 2,000 siloxane bonds; and/or a thermoplastic resin a' having a silicone chain having not more than 2,000 siloxane bonds.

The thermoplastic resin a is preferably at least one selected from the group consisting of acrylic polymers, rubbers, urethanic polymers and ethylene-vinyl acetate copolymers.

The silicone-based compound b is preferably at least one selected from the group consisting of silicone oils, modified silicone oils and silicone resins.

In the foamed body, the total content of the silicone-based compound b and the silicone chain moiety present in the thermoplastic resin a' having a silicone chain is, with respect to 100 parts by weight of the total amount of the thermoplastic resins in the foamed body, in terms of nonvolatile content, preferably 0.01 to 5 parts by weight, more preferably 0.05 to 4 parts by weight, and still more preferably 0.1 to 3 parts by weight.

The apparent density of the foamed body is, for example, preferably 0.2 to 0.7 g/cm$^3$, and the average cell diameter thereof is, for example, preferably 10 to 150 μm.

The thickness of the foamed body is, for example, 30 to 500 μm.

In an impact absorption test (the weight of an impactor: 96 g, the swing-up angle: 47°) using a pendulum impact tester, the value R obtained by dividing an impact absorption rate (%) defined by the following expression by a thickness (μm) of the foamed sheet is preferably not less than 0.08.

Impact absorption rate $(\%) = \{(F_0-F_1)/F_0\} \times 100$ wherein $F_0$ is an impact force when the impactor is made to collide with a support plate alone; and $F_1$ is an impact force when the impactor is made to collide with the support plate of a structural body composed of the support plate and the foamed sheet.

The foamed body may be a foamed body formed through step A of mechanically foaming an emulsion resin composition. In this case, the foamed body may be formed further through step B of coating a base material with the mechanically foamed emulsion resin composition followed by drying.

Step B may comprise preliminary drying step B1 of drying the bubble-containing emulsion resin composition applied on the base material at not less than 50° C. and less than 125° C., and regular drying step B2 of thereafter further drying the resultant at not less than 125° C. and not more than 200° C.

The number of the siloxane bonds in the silicone-based compound b having not more than 2,000 siloxane bonds is preferably not more than 1,000.

The apparent density of a foamed body is preferably 0.21 to 0.6 g/cm³, and more preferably 0.22 to 0.5 g/cm³.

Further the foamed body may have a pressure-sensitive adhesive layer on one face or both faces thereof.

The foamed sheet according to the present invention can be used as an impact absorption sheet for electric or electronic devices.

The present invention also provides an electric or electronic device using the foamed sheet.

The electric or electronic device includes one having a display member, and having a structure in which the foamed sheet is interposed between a housing of the electric or electronic device and the display member.

Advantageous Effects of Invention

The foamed sheet according to the present invention, since it comprises a specific silicone-based compound and/or a specific thermoplastic resin having a silicone chain as a constituent component of the foamed body, is improved in the recovery and the recovery speed of the thickness after being compressed, and even if being subjected to repeated impacts, hardly decreases in the impact absorption. Hence, even if forces are repeatedly applied on the foamed sheet in the processing time and the like of the foamed sheet, high impact absorption is maintained. Further the foamed sheet, since it is excellent in recovery after being compressed, and high in repeated impact absorption, hardly generates gaps; therefore, the improvement in waterproofness and dustproofness can also be anticipated. Here, it is presumed that the above action and effect is due to that the autohesion due to tackiness generation when the foamed body is compressed is suppressed by the addition of a specific silicone component.

BRIEF DESCRIPTION OF DRAWINGS

FIG. 1 is a schematic constitution view of a pendulum impact tester (impact testing apparatus).

FIG. 2 is a view illustrating a schematic constitution of a holding member of the pendulum impact tester (impact testing apparatus).

FIG. 3 is a schematic view illustrating a compression recovery test.

DESCRIPTION OF EMBODIMENTS

The foamed sheet according to the present invention comprises a foamed body formed of a resin composition comprising a thermoplastic resin a and a silicone-based compound b having not more than 2,000 siloxane bonds, and/or a thermoplastic resin a' having a silicone chain having not more than 2,000 siloxane bonds. The "silicone-based compound b having not more than 2,000 siloxane bonds" is referred to simply as "silicone-based compound b"; and the "thermoplastic resin a' having a silicone chain having not more than 2,000 siloxane bonds" is referred to simply as "thermoplastic resin a'," in some cases.

In the present invention, as at least a part of the thermoplastic resin a, there may be used the thermoplastic resin a' having a silicone chain having not more than 2,000 siloxane bonds. That is, the present invention includes, as constituent components of the foamed body, (1) an aspect of comprising the thermoplastic resin a and the silicone-based compound b, (2) an aspect of comprising the thermoplastic resin a', (3) an aspect of comprising the thermoplastic resin a' and the silicone-based compound b, and (4) an aspect of comprising the thermoplastic resin a', a thermoplastic resin other than the thermoplastic resin a', and the silicone-based compound b.

[The Thermoplastic Resin a]

The thermoplastic resin a is not especially limited, and publicly or commonly known resin materials (polymers) constituting foamed bodies can be used. Examples of the resin material include acrylic polymers, rubbers, urethanic polymers and ethylene-vinyl acetate copolymers. Among these, from the viewpoint of the impact absorption, acrylic polymers, rubbers and urethanic polymers are preferable. The thermoplastic resin a may be of a single kind or of not less than two kinds.

Here, from the viewpoint of the impact absorption of the foamed sheet, the resin material (polymer) is preferably selected from resin materials (polymers) having a Tg in the range of not less than −50° C. and less than 50° C. (the lower limit is preferably −40° C., and more preferably −30° C.; and the upper limit is preferably 40° C., and more preferably 30° C.)

The acrylic polymer is, from the viewpoint of the impact absorption, preferably one formed of, as essential monomer components, a monomer having a Tg of its homopolymer of not less than −10° C. and a monomer having a Tg of its homopolymer of less than −10° C.

Here, a "glass transition temperature (Tg) when a homopolymer is formed" (simply referred to as "Tg of a homopolymer" in some cases) in the present invention means a "glass transition temperature (Tg) of a homopolymer of the corresponding monomer"; and numerical values are specifically cited in "Polymer Handbook" (3rd edition, John Wiley & Sons, Inc., 1987). Here, Tgs of homopolymers of monomers which are not described in the above literature are values acquired, for example, by the following measurement method (see Japanese Patent Laid-Open No. 2007-51271). That is, 100 parts by weight of a monomer, 0.2 parts by weight of 2,2'-azobisisobutyronitrile, and 200 parts by weight of ethyl acetate as a polymerization solvent are charged in a reaction vessel equipped with a thermometer, a stirrer, a nitrogen introducing tube and a refluxing cooling tube, and stirred for 1 hour under the introduction of nitrogen gas. After oxygen in the polymerization system is removed in such a way, the system is heated up to 63° C. and allowed to react for 10 hours. Then, the system is cooled to room temperature to thereby obtain a homopolymer solution having a solid content concentration of 33% by weight. Then, the homopolymer solution is cast and applied on a separator, and dried to thereby fabricate a test sample (sheet-like homopolymer) having a thickness of about 2 mm. Then, the test sample is punched out into a disc of 7.9 mm in diameter, and interposed between parallel plates; and the viscoelasticity is measured by using a viscoelasticity tester (ARES, manufactured by Rheometric Scientific, Inc.) and in a temperature region of −70 to 150° C. at a temperature-rise rate of 5° C./min in a shearing mode under a shearing strain of 1 Hz in frequency, and the peak top temperature in tan δ is defined as Tg of the homopolymer. Here, also Tg of the resin material (polymer) can be measured by this method.

In a monomer having a Tg of its homopolymer of not less than −10° C., the Tg is, for example, −10° C. to 250° C., preferably 10 to 230° C., and more preferably 50 to 200° C.

Examples of the monomer having a Tg of its homopolymer of not less than −10° C. include (meth)acrylonitrile; amide group-containing monomers such as (meth)acrylamide and N-hydroxyethyl(meth)acrylamide; (meth)acrylic acid; alkyl (meth)acrylates having a Tg of their homopolymer of not less than −10° C., such as methyl methacrylate and ethyl methacrylate; isobornyl (meth)acrylate; heterocycle-containing vinyl monomers such as N-vinyl-2-pyrrolidone; and hydroxyl group-containing monomers such as 2-hydroxyethyl methacrylate. These can be used singly or in combinations of not less than two. Among these, from the viewpoint of the impact absorption, (meth)acrylonitrile (particularly acrylonitrile) is especially preferable.

In the monomer having a Tg of its homopolymer of less than −10° C., the Tg is, for example, not less than −70° C. and less than −10° C., preferably −70° C. to −12° C., and more preferably −65° C. to −15° C.

Examples of the monomer having a Tg of its homopolymer of less than −10° C. include alkyl (meth)acrylates having a Tg of their homopolymer of less than −10° C., such as ethyl acrylate, butyl acrylate and 2-ethylhexyl acrylate. These can be used singly or in combinations of not less than two. Among these, $C_{2-8}$ alkyl acrylates are especially preferable.

The content of a monomer having a Tg of its homopolymer of not less than −10° C. with respect to the whole monomer components (total amount of monomer components) forming the acrylic polymer is, for example, 2 to 30% by weight, and the lower limit is preferably 3% by weight, and more preferably 4% by weight; and the upper limit is preferably 25% by weight, and more preferably 20% by weight. The content of a monomer having a Tg of its homopolymer of less than −10° C. with respect to the whole monomer components (total amount of monomer components) forming the acrylic polymer is, for example, 70 to 98% by weight, and the lower limit is preferably 75% by weight, and more preferably 80% by weight; and the upper limit is preferably 97% by weight, and more preferably 96% by weight.

Here, when the monomer forming the acrylic polymer contains a nitrogen atom-containing copolymerizable monomer, and when an emulsion resin composition is subjected to shearing by a mechanical stirring or the like to be thereby caused to foam, the viscosity of the composition decreases and it becomes easy for a large number of bubbles to be entrapped in the emulsion; and thereafter, when the emulsion resin composition containing bubbles is applied on a base material and dried in its standing-still state, since the composition becomes easily aggregated and the viscosity increases, and the bubbles are held in the composition and it becomes difficult for the bubbles to diffuse outside. Hence, a foamed body excellent in the foamed property can be obtained.

Examples of the nitrogen atom-containing copolymerizable monomer (nitrogen atom-containing monomer) include cyano group-containing monomers such as (meth)acrylonitrile; lactam ring-containing monomers such as N-vinyl-2-pyrrolidone; and amide group-containing monomers such as (meth)acrylamide, N-hydroxyethyl(meth) acrylamide, N-methylolacrylamide, N,N-dimethylacrylamide, N,N-diethylacrylamide and diacetoneacrylamide. Among these, preferable are cyano group-containing monomers such as acrylonitrile, and lactam ring-containing monomers such as N-vinyl-2-pyrrolidone. The nitrogen atom-containing monomers can be used singly or in combinations of not less than two.

In an acrylic polymer having a structural unit originated from such a nitrogen atom-containing monomer, the content of the structural unit originated from the nitrogen atom-containing monomer is, with respect to the whole structural units constituting the acrylic polymer, preferably 2 to 30% by weight, and the lower limit thereof is more preferably 3% by weight, and still more preferably 4% by weight; and the upper limit thereof is more preferably 25% by weight, and still more preferably 20% by weight.

Further in an acrylic polymer having a structural unit originated from such a nitrogen atom-containing monomer, in addition to the structural unit originated from the nitrogen atom-containing monomer, a structural unit originated from a $C_{2-18}$ alkyl acrylate (particularly a $C_{2-8}$ alkyl acrylate) is preferably contained. The $C_{2-18}$ alkyl acrylates can be used singly or in combinations of not less than two. In such an acrylic polymer, the content of the structural unit originated from a $C_{2-18}$ alkyl acrylate (particularly a $C_{2-8}$ alkyl acrylate) is, with respect to the whole structural units constituting the acrylic polymer, preferably 70 to 98% by weight, and the lower limit thereof is more preferably 75% by weight, and still more preferably 80% by weight; and the upper limit thereof is more preferably 97% by weight, and still more preferably 96% by weight.

The rubber may be either of natural rubber and synthetic rubber. Examples of the rubber include nitrile rubber (NBR), methyl methacrylate-butadiene rubber (MBR), styrene-butadiene rubber (SBR), acrylic rubber (ACM, ANM), urethane rubber (AU) and silicone rubber. Among these, preferable are nitrile rubber (NBR), methyl methacrylate-butadiene rubber (MBR) and silicone rubber.

Examples of the urethanic polymer include polycarbonate-based polyurethane, polyester-based polyurethane and polyether-based polyurethane.

As the ethylene-vinyl acetate copolymer, publicly or commonly known ethylene-vinyl acetate copolymers can be used.

[The Thermoplastic Resin a']

In the present invention, a "thermoplastic resin" in the thermoplastic resin a' having a silicone chain having not more than 2,000 siloxane bonds includes the resins (for example, acrylic polymers, rubbers, urethanic polymers and ethylene-vinyl acetate copolymers) described in the above thermoplastic resin a. The silicone chain having not more than 2,000 siloxane bonds may constitute a main chain of the thermoplastic resin or a side chain thereof. The thermoplastic resin a' may be of a single kind or of not less than two kinds. Here, it is preferable that the number of the siloxane bonds of the silicone chain in the thermoplastic resin a' is not more than 1,000.

As the thermoplastic resin a', particularly preferable are silicone-modified acrylic polymers and silicone-modified urethanic polymers.

[The Silicone-Based Compound b]

In the present invention, the silicone-based compound b having not more than 2,000 siloxane bonds includes silicone oils, modified silicone oils and silicone resins. The silicone-based compound b can be used singly or in combinations of not less than two. Here, it is preferable that the number of the siloxane bonds in the silicone-based compound b is not more than 1,000.

Examples of the silicone oils (straight silicone oils) include dimethyl silicone oils and methyl phenyl silicone oils.

Examples of the modified silicone oils include polyether-modified silicone oils (polyether-modified dimethyl silicone oils and the like), alkyl-modified silicone oils (alkyl-modified dimethyl silicone oils and the like), aralkyl-modified silicone oils (aralkyl-modified dimethyl silicone oils and the like), higher fatty acid ester-modified silicone oils (higher fatty acid ester-modified dimethyl silicone oils and the like) and fluoroalkyl-modified silicone oils (fluoroalkyl-modified dimethyl silicone oils and the like).

Among these, polyether-modified silicones are preferable. Examples of commercially available products of the polyether-modified silicone oils include straight chain-type ones such as "PEG 11 Methyl Ether Dimethicone," "PEG/PPG-20/22 Butyl Ether Dimethicone," "PEG-9 Methyl Ether Dimethicone," "PEG-32 Methyl Ether Dimethicone," "PEG-9 Dimethicone," "PEG-3 Dimethicone" and "PEG-10 Dimethicone"; and branched chain-type ones such as "PEG-9 Polydimethylsiloxyethyl Dimethicone" and "Lauryl PEG-9 Polydimethylsiloxyethyl Dimethicone" (which are all manufactured by Shin-Etsu Silicone).

The silicone resins include straight silicone resins and modified silicone resins. Examples of the straight silicone resins include methyl silicone resins and methyl phenyl silicone resins. Examples of the modified silicone resins include alkyd-modified silicone resins, epoxy-modified silicone resins, acryl-modified silicone resins and polyester-modified silicone resins.

In the foamed body, the total content of the silicone-based compound b and the silicone chain moiety present in the thermoplastic resin a' having a silicone chain is, with respect to 100 parts by weight of the thermoplastic resins in the foamed body, in terms of nonvolatile content, for example, 0.01 to 5 parts by weight. The lower limit of the total content is preferably 0.05 parts by weight, and more preferably 0.1 parts by weight; and the upper limit is preferably 4 parts by weight, and more preferably 3 parts by weight. In the case where the total content of the silicone component and the silicone chain moiety in the foamed body is in the above range, the recovery and the recovery speed after compression can be improved without impairing the properties as the foamed body.

Further in the foamed body, the total content of the silicone-based compound b and the silicone chain moiety present in the thermoplastic resin a' having a silicone chain is, in terms of nonvolatile content, for example, 0.01 to 5% by weight. The lower limit of the total content is preferably 0.05% by weight, and more preferably 0.1% by weight; and the upper limit is preferably 4% by weight, and more preferably 3% by weight. In the case where the total content of the silicone component and the silicone chain moiety in the foamed body is in the above range, the recovery and the recovery speed after compression can be improved without impairing the properties as the foamed body.

The thickness of the foamed sheet according to the present invention is not especially limited, but is generally 30 to 500 μm, and the lower limit thereof is preferably 40 μm, and more preferably 50 μm; and the upper limit is preferably 400 μm, more preferably 300 μm, and still more preferably 200 μm. When the thickness of the foamed sheet is made to be not less than 30 μm, cells can be incorporated uniformly, and excellent impact absorption can be exhibited. Further in the case where the thickness of the foamed sheet is made to be not more than 500 μm, the foamed sheet can easily conform to fine clearances. The foamed sheet according to the present invention, even if having as small a thickness as 30 to 500 μm, for example, is excellent in impact absorption.

The apparent density of the foamed body constituting the foamed sheet according to the present invention is not especially limited, but is generally 0.2 to 0.7 g/cm$^3$. The lower limit thereof is preferably 0.21 g/cm$^3$, and more preferably 0.22 g/cm$^3$; and the upper limit is preferably 0.6 g/cm$^3$, more preferably 0.5 g/cm$^3$, and still more preferably 0.4 g/cm$^3$. When the density of the foamed body is not less than 0.2 g/cm$^3$, a high strength can be maintained; and when it is not more than 0.7 g/cm$^3$, high impact absorption is exhibited. Further when the apparent density of the foamed body is in the range of 0.2 to 0.4 g/cm$^3$, much higher impact absorption is exhibited.

The average cell diameter of the foamed body is not especially limited, but is generally 10 to 150 μm. The lower limit thereof is preferably 15 μm, and more preferably 20 μm; and the upper limit is preferably 140 μm, more preferably 130 μm, and still more preferably 100 μm. In the case where the average cell diameter is not less than 10 μm, excellent impact absorption is exhibited. Further in the case where the average cell diameter is not more than 100 μm, compression recovery is also excellent. Here, the maximum cell diameter of the foamed body is, for example, 40 to 400 μm, and the lower limit thereof is preferably 60 μm, and more preferably 80 μm; and the upper limit is preferably 300 μm, and more preferably 220 μm. Further the minimum cell diameter of the foamed body is, for example, 5 to 70 μm, and the lower limit thereof is preferably 8 μm, and more preferably 10 μm; and the upper limit is preferably 60 μm, and more preferably 50 μm.

In the present invention, from the viewpoint of the impact absorption, the ratio of the average cell diameter (μm) to the thickness (μm) of the foamed sheet (foamed body) (the former/the latter) is preferably in the range of 0.2 to 0.9. The lower limit of the ratio of the average cell diameter (μm) to the thickness (μm) of the foamed sheet is preferably 0.25, and more preferably 0.3; and the upper limit is preferably 0.85, and more preferably 0.8.

With respect to the foamed body constituting the foamed sheet according to the present invention, the composition, the cell structure and the like thereof are not especially limited as long as the foamed body has the above properties. The cell structure may be any of an open cell structure, a closed cell structure and a semi-open semi-closed cell structure. From the viewpoint of the impact absorption, an open cell structure and a semi-open semi-closed cell structure are preferable.

The foamed sheet according to the present invention, even if having a small thickness, has excellent impact absorption. For example, in an impact absorption test (the weight of an impactor: 96 g, the swing-up angle: 47°) (23° C.) using a pendulum impact tester, an impact absorption rate R per unit thickness is determined by dividing an impact absorption rate (%) defined by the following expression by a thickness (μm) of the foamed sheet. At this time, the R of the foamed sheet according to the present invention becomes, for example, not less than 0.08. The upper limit value of the R is, for example, about 0.5 (usually about 0.3).

Impact absorption rate (%)={$(F_0-F_1)/F_0$}×100 wherein $F_0$ is an impact force when the impactor is made to collide with a support plate alone; and $F_1$ is an impact force when the impactor is made to collide with the support plate of a structural body composed of the support plate and the foamed sheet.

Here, the impact absorption rate is, though different depending on the thickness and the like of the foamed sheet, usually 5 to 70%, and the lower limit is preferably 7%, more preferably 9%, and especially preferably 10%; and the upper limit is preferably 60% (usually about 30%).

The schematic constitution of a pendulum impact tester (impact testing apparatus) will be described by way of FIG. 1 and FIG. 2. As illustrated in FIG. 1 and FIG. 2, an impact testing apparatus 1 (pendulum tester 1) is constituted of a holding member 3 as a holding means to hold a test piece 2 (foamed sheet 2) by an arbitrary holding force, an impact applying member 4 to apply an impact stress on the test piece 2, a pressure sensor 5 as an impact force detecting means to detect an impact force on the test piece 2 by the impact applying member 4, and the like. Further the holding member 3 to hold the test piece 2 by an arbitrary holding force is constituted of a fixing jig 11, and a pressing jig 12 facing the fixing jig 11 and being slidable so that the test piece 2 is interposed and held between the fixing jig 11 and the pressing jig 12. Further the pressing jig 12 is provided with a pressure adjusting means 16. Further the impact applying member 4 to apply an impact force on the test piece 2 held by the holding member 3 is constituted of a support rod 23 (shaft 23) whose one end 22 is rotatably supported on a support column 20 and whose other end side has an impactor 24, and an arm 21 to lift and hold the impactor 24 at a predetermined angle. Here since a steel ball is used as the impactor 24, by providing an electromagnet 25 on one end of the arm, the impactor 24 is enabled to be unifiedly lifted at the predetermined angle. Further the pressure sensor 5 to detect an impact force acting on the test piece 2 by the impact applying member 4 is provided on the face side of the fixing jig 11 opposite to the face thereof contacting the test piece.

The impactor 24 is a steel ball (iron ball). Further the angle (swing-up angle a in FIG. 1) at which the impactor 24 is lifted by the arm 21 is 47°. The weight of the steel ball (iron ball) is 96 g.

As illustrated in FIG. 2, the test piece 2 (foamed sheet 2) is interposed between the fixing jig 11 and the pressing jig 12 through a support plate 28 constituted of a highly elastic plate material such as a resinous plate material (acryl plate, polycarbonate plate or the like) or a metal plate material.

The impact absorption is calculated by the expression described before by using the above impact testing apparatus, and determining an impact force $F_0$ measured by closely fixing the fixing jig 11 and the support plate 28 on each other and then making the impactor 24 collide with the support plate 28, and an impact force $F_1$ measured by inserting and closely fixing the test piece 2 between the fixing jig 11 and the support plate 28 and then making the impactor 24 collide with the support plate 28. Here, the impact testing apparatus is a similar apparatus as used in Example 1 of Japanese Patent Laid-Open No. 2006-47277.

The foamed body constituting the foamed sheet, in addition to the thermoplastic resin and the silicone-based compound, may contain, as required, a surfactant, a crosslinking agent, a thickener, a rust preventive and other additives.

For example, for the micronization of the cell diameter and the stabilization of cells foamed, an optional surfactant (foaming agent, foam stabilizer) may be contained. The surfactant is not especially limited, and there may be used any of an anionic surfactant, a cationic surfactant, a nonionic surfactant, an amphoteric surfactant and the like; but from the viewpoint of the micronization of the cell diameter and the stabilization of cells foamed, an anionic surfactant is preferable, and a fatty acid ammonium-based surfactant, particularly ammonium stearate or the like, is more preferable. The surfactants may be used singly or in combinations of not less than two. Further dissimilar surfactants may be used concurrently, and for example, an anionic surfactant and a nonionic surfactant, or an anionic surfactant and an amphoteric surfactant may be used concurrently.

The amount [solid content (nonvolatile content)] of the surfactant to be added is, with respect to 100 parts by weight of the thermoplastic resin [solid content (nonvolatile content)], for example, 0 to 10 parts by weight, and the lower limit is preferably 0.5 parts by weight; and the upper limit is preferably 8 parts by weight.

Further in order to improve the strength, heat resistance and moisture resistance of the foamed body, an optional crosslinking agent may be contained. The crosslinking agent is not especially limited, and either of an oil-soluble one and a water-soluble one may be used. Examples of the crosslinking agent include epoxy-based, oxazoline-based, isocyanate-based, carbodiimide-based, melamine-based and metal oxide-based ones. Among these, oxazoline-based crosslinking agents are preferable.

The amount [solid content (nonvolatile content)] of the crosslinking agent to be added is, with respect to 100 parts by weight of the thermoplastic resin [solid content (nonvolatile content)], for example, 0 to 10 parts by weight, and the lower limit is preferably 0.01 parts by weight, and the upper limit is preferably 9 parts by weight.

Further for the stabilization of cells foamed and the improvement of the film formability, an optional thickener may be contained. The thickener is not especially limited, and includes acrylic acid-based, urethanic and polyvinyl alcoholic ones. Among these, polyacrylic acid-based thickeners and urethanic thickeners are preferable.

The amount [solid content (nonvolatile content)] of the thickener to be added is, with respect to 100 parts by weight of the thermoplastic resin [solid content (nonvolatile content)], for example, 0 to 10 parts by weight, and the lower limit is preferably 0.1 parts by weight; and the upper limit is preferably 5 parts by weight.

Further in order to prevent the corrosion of metal members adjacent to the foamed sheet, an optional rust preventive may be contained. The rust preventive is preferably an azole ring-containing compound. When an azole ring-containing compound is used, both the corrosion prevention of metals and the close adhesion with objects can be met simultaneously in high levels.

The azole ring-containing compound suffices as long as being a compound having 5-membered ring containing not less than one nitrogen atom in the ring, and examples include compounds having a diazole (imidazole, pyrazole) ring, a triazole ring, a tetrazole ring, an oxazole ring, an isoxazole ring, a triazole ring or an isothiazole ring. These rings may be condensed with an aromatic ring such as a benzene ring to thereby form condensed rings. Examples of compounds having such a condensed ring include compounds having a benzimidazole ring, a benzopyrazole ring, a benzotriazol ring, a benzoxazole ring, a benzisoxazole ring, a benzothiazole ring or a benzisothiazole ring.

The azole ring and the condensed rings (benzotriazole ring, benzothiazole ring and the like) may each have a substituent. Examples of the substituent include alkyl groups having 1 to 6 carbon atoms (preferably having 1 to 3 carbon atoms) such as a methyl group, an ethyl group, a propyl group, an isopropyl group and a butyl group; alkoxy groups having 1 to 12 carbon atoms (preferably having 1 to 3 carbon atoms) such as a methoxy group, an ethoxy group, an isopropyloxy group and a butoxy group; aryl groups having 6 to 10 carbon atoms such as a phenyl group, a tolyl group and a naphthyl group; an amino group; (mono- or di-) $C_{1-10}$ alkylamino groups such as a methylamino group and a dimethylamino group; amino-$C_{1-6}$ alkyl groups such as an aminomethyl group and 2-aminoethyl group; mono- or di-($C_{1-10}$ alkyl)amino-$C_{1-6}$ alkyl groups such as an N,N-diethylaminomethyl group and an N,N-bis(2-ethylhexyl) aminomethyl group; a mercapto group; alkoxycarbonyl groups having 1 to 6 carbon atoms such as a methoxycarbonyl group and an ethoxycarbonyl group; a carboxyl group; carboxy-$C_{1-6}$ alkyl groups such as a carboxymethyl group; carboxy-$C_{1-6}$ alkylthio groups such as 2-carboxyethylthio group; N,N-bis(hydroxy-$C_{1-4}$ alkyl)amino-$C_{1-4}$ alkyl groups such as an N,N-bis(hydroxymethyl)aminomethyl group; and a sulfo group. Further the azole ring-containing compound may form a salt such as a sodium salt or a potassium salt.

From the viewpoint of the rust preventive action on metals, preferable are compounds in which an azole ring forms a condensed ring with an aromatic ring such as a benzene ring; and among these, especially preferable are benzotriazole-based compounds (compounds having a benzotriazole ring) and benzothiazole-based compounds (compounds having a benzothiazole ring).

Examples of the benzotriazole-based compounds include 1,2,3-benzotriazole, methylbenzotriazole, carboxybenzotriazole, carboxymethylbenzotriazole, 1-[N,N-bis(2-ethylhexyl)aminomethyl]benzotriazole, 1-[N,N-bis(2-ethylhexyl)aminomethyl]methylbenzotriazole, 2,2'-[[(methyl-1H-benzotriazol-1-yl)methyl]imino]bisethanol, and sodium salts thereof.

Examples of the benzothiazole-based compounds include 2-mercaptobenzothiazole, 3-(2-(benzothiazolyl)thio)propionic acid, and sodium salts thereof.

The azole ring-containing compounds may be used singly or in combinations of not less than two.

The amount [solid content (nonvolatile content)] of the rust preventive (for example, the azole ring-containing compound) [solid content (nonvolatile content)] to be added suffices as long as being in the range of not impairing the close adhesion with objects and the intrinsic property of the foamed body, and is, for example, with respect to 100 parts by weight of the thermoplastic resin [solid content (nonvolatile content)], for example, preferably 0.2 to 5 parts by weight. The lower limit thereof is more preferably 0.3 parts by weight, and still more preferably 0.4 parts by weight; and the upper limit thereof is more preferably 3 parts by weight, and still more preferably 2 parts by weight.

Further optional other suitable components may be contained in the range of not impairing the impact absorption. Such other components may be contained in one kind thereof alone, or may be contained in not less than two kinds thereof. Examples of the other components include polymer components other than the above, softening agents, antioxidants, antiaging agents, gelling agents, curing agents, plasticizers, filling agents, reinforcing agents, foaming agents (sodium bicarbonate and the like), microcapsules (thermally expandable microballs and the like), flame retardants, light stabilizers, ultraviolet absorbents, coloring agents (pigments, dyes and the like), pH regulators, solvents (organic solvents), thermopolymerization initiators and photopolymerization initiators. The amounts [solid contents (nonvolatile contents)] of these components to be added suffices as long as being in the range of not impairing the close adhesion with objects and the intrinsic property of the foamed body, and are each, for example, with respect to 100 parts by weight of the thermoplastic resin [solid content (nonvolatile content)], preferably in the range of, for example, 0.2 to 60 parts by weight. The amount [solid content (nonvolatile content)] of the foaming agent (sodium bicarbonate or the like) to be added is, with respect to 100 parts by weight of the thermoplastic resin [solid content (nonvolatile content)], more preferably 0.5 to 20 parts by weight. The amount [solid content (nonvolatile content)] of the microcapsule (thermally expandable microball or the like) to be added is, with respect to 100 parts by weight of the thermoplastic resin [solid content (nonvolatile content)], more preferably 0.2 to 10 parts by weight. The amount [solid content (nonvolatile content)] of the filling agent to be added is, with respect to 100 parts by weight of the thermoplastic resin [solid content (nonvolatile content)], more preferably 0.3 to 50 parts by weight.

Examples of the filling agents include silica, clay (mica, talc, smectite and the like), alumina, aluminum hydroxide, hydroxides of alkaline earth metals (magnesium hydroxide and the like), carbonate salts of alkaline earth metals (calcium carbonate and the like), titania, zinc oxide, tin oxide, zeolite, graphite, carbon black, carbon nanotubes, inorganic fibers (carbon fibers, glass fibers, potassium titanate fibers and the like), organic fibers, metal powders (silver, copper, and the like) and waxes (polyethylene wax, polypropylene wax, and the like). Further as the filling agent, there can also be added piezoelectric particles (titanium oxide, barium titanate and the like), electroconductive particles (electroconductive carbon black, electroconductive titanium oxide, tin oxide and the like), thermoconductive particles (boron nitride and the like), organic fillers (silicone powder, polyethylene powder, polypropylene powder and the like) and the like. In the case of using silica as the filling agent, the amount thereof to be added is, with respect to 100 parts by weight of the thermoplastic resin [solid content (nonvolatile content)], especially preferably in the range of 0.5 to 40 parts by weight. Further in the case of using clay such as mica as the filling agent, the amount thereof to be added is, with respect to 100 parts by weight of the thermoplastic resin [solid content (nonvolatile content)], especially preferably in the range of 0.3 to 10 parts by weight. Further in the case of using a piezoelectric particle as the filling agent, the amount thereof to be added is, with respect to 100 parts by weight of the thermoplastic resin [solid content (nonvolatile content)], especially preferably in the range of 5 to 40 parts by weight. Further in the case of using an electroconductive particle as the filling agent, the amount thereof to be added is, with respect to 100 parts by weight of the thermoplastic resin [solid content (nonvolatile content)], especially preferably in the range of 5 to 40 parts by weight. Further when a piezoelectric particle and an electroconductive particle are used in combination as the filling agent, the amount of charge to be generated can be regulated by the pressure. In this case, the ratio of the piezoelectric particle to the electroconductive particle, for example the former/the latter (weight ratio) is preferably 10/90 to 90/10, preferably 20/80 to 80/20, and still more preferably 30/70 to 70/30.

The foamed sheet according to the present invention can be produced by subjecting a resin composition containing the resin material (thermoplastic resin) constituting the foamed body to expansion molding. As a foaming method (method of forming cells), there can be employed methods usually used for expansion molding, including physical methods and chemical methods. The physical methods generally involve dispersing a gas component such as air or nitrogen in a polymer solution, and forming bubbles by mechanical mixing. The chemical methods are ones in which cells are formed by a gas generated by thermal decomposition of a foaming agent added to a polymer base, to thereby obtain foamed bodies. From the viewpoint of environmental problems and the like, the physical methods are preferable. Cells to be formed by the physical methods are open cells in many cases.

As the resin composition (the resin composition comprising a thermoplastic resin a and a silicone-based compound b having not more than 2,000 siloxane bonds, and/or a thermoplastic resin a' having a silicone chain having not more than 2,000 siloxane bonds) containing the resin material (the thermoplastic resin(s)) to be supplied to expansion molding, there may be used a resin solution in which the resin material is dissolved in a solvent, but from the viewpoint of the foamability, an emulsion containing the resin material is preferably used. Not less than two emulsions may be blended and used as the emulsion.

It is preferable from the viewpoint of the film formability that the solid content concentration of the emulsion is higher. The solid content concentration of the emulsion is preferably not less than 30% by weight, more preferably not less than 40% by weight, and still more preferably not less than 50% by weight.

In the present invention, a method is preferable in which a foamed body is fabricated through a step (step A) of mechanically foaming an emulsion resin composition to thereby foam the emulsion resin composition. A foaming apparatus is not especially limited, and examples thereof include apparatuses such as a high-speed shearing system, a vibration system, and a discharge system of a pressurized gas. Among these, from the viewpoint of the micronization of the cell diameter and the fabrication of a large volume, a high-speed shearing system is preferable.

Bubbles foamed by mechanical stirring are ones of gas entrapped in the emulsion. The gas is not especially limited as long as being inactive to the emulsion, and includes air, nitrogen and carbon dioxide. Among these, from the viewpoint of the economical efficiency, air is preferable.

By subjecting the emulsion resin composition foamed by the above method to a step (step B) of coating a base material with the emulsion resin composition followed by drying, the foamed sheet according to the present invention can be obtained. The base material is not especially limited, but examples thereof include release-treated plastic films (release-treated polyethylene terephthalate films and the like), plastic films (polyethylene terephthalate films and the like) and thermoconductive layers (thermoconductive layers described later). In the case of coating by using a thermoconductive layer as the base material, the close adhesion of a foamed body layer with the thermoconductive layer can be improved and the efficiency of a drying step in the fabrication of the foamed body layer can also be improved.

As a coating method and a drying method in step B, usual methods can be employed. It is preferable that step B comprises preliminary drying step B1 of drying the bubble-containing emulsion resin composition applied on the base material at not less than 50° C. and less than 125° C., and regular drying step B2 of thereafter further drying the resultant at not less than 125° C. and not more than 200° C.

By providing preliminary drying step B1 and regular drying step B2, the coalescence of bubbles and the burst of bubbles due to a rapid temperature rise can be prevented. Particularly in the foamed sheet having a small thickness, since bubbles coalesce or burst in a rapid rise of the temperature, the significance of the provision of preliminary drying step B1 is large. The temperature in preliminary drying step B1 is preferably not less than 50° C. and not more than 100° C. The time of preliminary drying step B1 is, for example, 0.5 min to 30 min, and preferably 1 min to 15 min. Further the temperature in regular drying step B2 is preferably not less than 130° C. and not more than 180° C., and more preferably not less than 130° C. and not more than 160° C. The time of regular drying step B2 is, for example, 0.5 min to 30 min, and preferably 1 min to 15 min.

With respect to the average cell diameter, the maximum cell diameter and the minimum cell diameter of the foamed body, by regulation of the kind and the amount of the surfactant, and regulation of the stirring rate and the stirring time in the mechanical stirring, there can be obtained the foamed sheet having an average cell diameter, for example, in the range of 10 to 150 µm.

With respect to the apparent density of the foamed body, by regulation of the amount of the gas component entrapped in the emulsion resin composition in the mechanical stirring, there can be obtained the foamed sheet having an apparent density of, for example, 0.2 to 0.7 g/cm$^3$.

The foamed sheet according to the present invention is excellent in compression recovery, and recovers its thickness in a short time after being compressed. For example, in the following compression recovery test, the foamed sheet recovers by not less than 90% 10 min after the compression release, and recovers by not less than 95% 24 hours thereafter.

Compression Recovery Test:

The compression recovery test can be carried out by a method indicated in FIG. 3 (see JIS K6262). The foamed sheets (foamed bodies) (sample size: 50 mm×50 mm) are laminated to a thickness of about 1 mm to thereby make a test piece 31. The test piece 31 is placed on a compression plate (smooth stainless steel plate) 30A; spacers 32, 32 having a predetermined thickness are placed on outer sides of the test piece in a sandwiching manner; these are compressed until a compression plate (smooth stainless steel plate) 30B comes into close contact with the spacers 32; and the entire is fixed by clips 33, 33 (the test piece 31 is compressed to 50% of the original thickness of the test piece 31). The entire is left standing in that state at room temperature (23° C.) for 22 hours; thereafter, the clips 33, 33 are removed to thereby release the test piece 31 from the compressed state. The thickness of the test piece 31 after the compression release is measured with time and the compression recovery is determined by the following expression.

Compression recovery (%)=[{(a thickness (mm) of the test piece after a lapse of a predetermined time after the compression release)/(a thickness (mm) of the test piece before the compression)}×100]

Further the foamed sheet according to the present invention is excellent in repeated impact absorption. The repeated impact absorption is determined by the following expression, by using the above-mentioned pendulum impact tester (impact testing apparatus), carrying out impact tests five times in total within 10 sec on one test piece under the conditions of a weight of the impactor of 96 g, a swing-up angle of 47° and 23° C., and measuring an initial impact absorption rate (impact absorption rate of the first impact test) S1 (%) and an impact absorption rate after the five impact tests (impact absorption rate of the fifth impact test) S5 (%). In the foamed sheet according to the present invention, the value of the repeated impact absorption becomes not less than 80%.

Repeated impact absorption (%)=(S5/S1)×100

Here, the foamed sheet according to the present invention may have a pressure-sensitive adhesive layer on one face or on both faces of the foamed body. A pressure-sensitive adhesive constituting the pressure-sensitive adhesive layer is not especially limited, and may be any of an acrylic pressure-sensitive adhesive, a rubber-based pressure-sensitive adhesive, a silicone-based pressure-sensitive adhesive and the like. Further in the case of providing the pressure-sensitive adhesive layer, a release liner to protect the pressure-sensitive adhesive layer until its usage may be laminated on its face. Here, in the case where the foamed body constituting the foamed sheet according to the present invention exhibits slight tackiness, members and the like can be fixed even without providing the pressure-sensitive adhesive layer.

The foamed sheet according to the present invention may be distributed to markets as a wound body (roll-like material) wound in a rolled form.

The foamed sheet according to the present invention is excellent in recovery after being compressed, and hardly decreases in the impact absorption even if being subjected to repeated impacts. Hence, for example, in electric or electronic devices, the foamed sheet is useful as a member, particularly an impact absorption sheet, for electric or electronic devices to be used when various types of members or components (for example, optical members) are attached (installed) on predetermined sites (for example, housings).

Examples of optical members attachable (installable) by utilizing the foamed sheet according to the present invention include image display members (particularly small-size image display members) installed on image display apparatuses such as liquid crystal displays, electroluminescence displays and plasma displays, display members, such as touch panels, installed on mobile communication apparatuses such as so-called "cellular phones," "smartphones" and "personal digital assistants," cameras and lenses (particularly small-size cameras and lenses).

The electric or electronic device according to the present invention uses the foamed sheet according to the present invention. Such an electric or electronic device includes, for example, an electric or electronic device having a display member, and having a structure in which the foamed sheet is interposed between a housing of the electric or electronic device and the display member. Examples of the electric or electronic device include mobile communication apparatuses such as so-called "cellular phones," "smartphones" and "personal digital assistants."

EXAMPLES

Hereinafter, the present invention will be described in more detail by way of Examples, but the present invention is not limited to these Examples. Here, unless otherwise mentioned, "%" representing a content means % by weight.

Here, the numbers of parts (parts by weight) blended are all values in terms of solid content (nonvolatile content).

Example 1

100 parts by weight of an acryl emulsion solution (the amount of the solid content: 55%, an ethyl acrylate-butyl acrylate-acrylonitrile copolymer (45:48:7 in weight ratio)), 1 part by weight of a silicone-based compound A (a dimethyl silicone oil, the number-average molecular weight Mn: $7.16 \times 10^3$, the weight-average molecular weight Mw: $1.71 \times 10^4$, the amount of the solid content (nonvolatile content): 100%), 3 parts by weight of a fatty acid ammonium-based surfactant (a water dispersion of ammonium stearate, the amount of the solid content: 33%), 0.35 parts by weight of an oxazoline-based crosslinking agent ("Epocros WS-500," manufactured by Nippon Shokubai Co., Ltd., the amount of the solid content: 39%), 1 part by weight of a benzotriazole sodium salt (the solid content: 40%) (a rust preventive), and 0.8 parts by weight of a polyacrylic acid-based thickener (an ethyl acrylate-acrylic acid copolymer (acrylic acid: 20% by weight), the amount of the solid content: 28.7%) were stirred and mixed by a Disper ("Robomix," manufactured by Primix Corp.) and thereby foamed. The foamed composition was applied on a release-treated PET (polyethylene terephthalate) film (the thickness: 38 μm, the trade name: "MRF#38," manufactured by Mitsubishi Plastics, Inc.), and dried at 70° C. for 4.5 min and 140° C. for 4.5 min to thereby obtain a foamed body (foamed sheet) of an open cell structure having a thickness of 130 μm, an apparent density of 0.37 g/cm$^3$, a cell porosity of 62.6%, a maximum cell diameter of 63.5 μm, a minimum cell diameter of 19.3 μm and an average cell diameter of 36 μm.

Example 2

100 parts by weight of an acryl emulsion solution (the amount of the solid content: 55%, an ethyl acrylate-butyl acrylate-acrylonitrile copolymer (45:48:7 in weight ratio)), 0.25 parts by weight of a silicone-based compound A (a dimethyl silicone oil, the number-average molecular weight Mn: $7.16 \times 10^3$, the weight-average molecular weight Mw: $1.71 \times 10^4$, the amount of the solid content (nonvolatile content): 100%), 3 parts by weight of a fatty acid ammonium-based surfactant (a water dispersion of ammonium stearate, the amount of the solid content: 33%), 0.35 parts by weight of an oxazoline-based crosslinking agent ("Epocros WS-500," manufactured by Nippon Shokubai Co., Ltd., the amount of the solid content: 39%), 1 part by weight of a benzotriazole sodium salt (the solid content: 40%) (a rust preventive), and 0.8 parts by weight of a polyacrylic acid-based thickener (an ethyl acrylate-acrylic acid copolymer (acrylic acid: 20% by weight), the amount of the solid content: 28.7%) were stirred and mixed by a Disper ("Robomix," manufactured by Primix Corp.) and thereby foamed. The foamed composition was applied on a release-treated PET (polyethylene terephthalate) film (the thickness: 38 μm, the trade name: "MRF#38," manufactured by Mitsubishi Plastics, Inc.), and dried at 70° C. for 4.5 min and 140° C. for 4.5 min to thereby obtain a foamed body (foamed sheet) of an open cell structure having a thickness of 130 μm, an apparent density of 0.27 g/cm$^3$, a cell porosity of 73.0%, a maximum cell diameter of 112 μm, a minimum cell diameter of 12.5 μm and an average cell diameter of 47 μm.

Example 3

100 parts by weight of an acryl emulsion solution (the amount of the solid content: 55%, an ethyl acrylate-butyl acrylate-acrylonitrile copolymer (45:48:7 in weight ratio)), 1 part by weight of a silicone-based compound B ("KF-6016", manufactured by Shin-Etsu Silicone, polyether-modified silicone (PEG-9 Methyl Ether Dimethicone), the amount of the solid content (nonvolatile content): 100%), 3 parts by weight of a fatty acid ammonium-based surfactant (a water dispersion of ammonium stearate, the amount of the solid content: 33%), 0.35 parts by weight of an oxazoline-based crosslinking agent ("Epocros WS-500," manufactured by Nippon Shokubai Co., Ltd., the amount of the solid content: 39%), 1 part by weight of a benzotriazole sodium salt (the solid content: 40%) (a rust preventive), and 0.8 parts by weight of a polyacrylic acid-based thickener (an ethyl acrylate-acrylic acid copolymer (acrylic acid: 20% by weight), the amount of the solid content: 28.7%) were stirred and mixed by a Disper ("Robomix," manufactured by Primix Corp.) and thereby foamed. The foamed composition was applied on a release-treated PET (polyethylene terephthalate) film (the thickness: 38 μm, the trade name: "MRF#38," manufactured by Mitsubishi Plastics, Inc.), and dried at 70° C. for 4.5 min and 140° C. for 4.5 min to thereby obtain a foamed body (foamed sheet) of an open cell structure having a thickness of 120 μm, an apparent density of 0.39 g/cm$^3$, a cell porosity of 61.2%, a maximum cell diameter of 78.8 μm, a minimum cell diameter of 15.8 μm and an average cell diameter of 41 μm.

Example 4

100 parts by weight of an acryl emulsion solution (the amount of the solid content: 55%, an ethyl acrylate-butyl acrylate-acrylonitrile copolymer (45:48:7 in weight ratio)), 1 part by weight of a silicone-based compound C ("KF-6011", manufactured by Shin-Etsu Silicone, polyether-modified silicone (PEG-11 Methyl Ether Dimethicone), the amount of the solid content (nonvolatile content): 100%), 3 parts by weight of a fatty acid ammonium-based surfactant (a water dispersion of ammonium stearate, the amount of the solid content: 33%), 0.35 parts by weight of an oxazoline-based crosslinking agent ("Epocros WS-500," manufactured by Nippon Shokubai Co., Ltd., the amount of the solid content: 39%), 1 part by weight of a benzotriazole sodium salt (the solid content: 40%) (a rust preventive), and 0.8 parts by weight of a polyacrylic acid-based thickener (an ethyl acrylate-acrylic acid copolymer (acrylic acid: 20% by weight), the amount of the solid content: 28.7%) were stirred and mixed by a Disper ("Robomix," manufactured by Primix Corp.) and thereby foamed. The foamed composition was applied on a release-treated PET (polyethylene terephthalate) film (the thickness: 38 μm, the trade name: "MRF#38," manufactured by Mitsubishi Plastics, Inc.), and dried at 70° C. for 4.5 min and 140° C. for 4.5 min to thereby obtain a foamed body (foamed sheet) of an open cell structure having a thickness of 130 μm, an apparent density of 0.34 g/cm$^3$, a cell porosity of 65.9%, a maximum cell diameter of 109 μm, a minimum cell diameter of 10 μm and an average cell diameter of 47 μm.

Comparative Example 1

100 parts by weight of an acryl emulsion solution (the amount of the solid content: 55%, an ethyl acrylate-butyl acrylate-acrylonitrile copolymer (45:48:7 in weight ratio)), 3 parts by weight of a fatty acid ammonium-based surfactant (a water dispersion of ammonium stearate, the amount of the solid content: 33%), 0.35 parts by weight of an oxazoline-based crosslinking agent ("Epocros WS-500," manufactured by Nippon Shokubai Co., Ltd., the amount of the solid content: 39%), 1 part by weight of a benzotriazole sodium salt (the solid content: 40%) (a rust preventive), and 0.8 parts by weight of a polyacrylic acid-based thickener (an ethyl acrylate-acrylic acid copolymer (acrylic acid: 20% by weight), the amount of the solid content: 28.7%) were stirred and mixed by a Disper ("Robomix," manufactured by Primix Corp.) and thereby foamed. The foamed composition was applied on a release-treated PET (polyethylene terephthalate) film (the thickness: 38 μm, the trade name: "MRF#38," manufactured by Mitsubishi Plastics, Inc.), and dried at 70° C. for 4.5 min and 140° C. for 4.5 min to thereby obtain a foamed body (foamed sheet) of an open cell structure having a thickness of 130 μm, an apparent density of 0.31 g/cm$^3$, a cell porosity of 69.0%, a maximum cell diameter of 111 μm, a minimum cell diameter of 26.1 μm and an average cell diameter of 63 μm.

<Evaluations>

The foamed bodies (foamed sheets) obtained in the Examples and the Comparative Example were evaluated for the following. The results are shown in Table 2. In Table 1, there is shown the number of parts (parts by weight) [in terms of solid content (nonvolatile content)] of each component blended in each Example and Comparative Example. "Em" indicates an emulsion.

(The Average Cell Diameter)

The average cell diameter (μm) was determined by taking and image analyzing an enlarged image of a foamed body cross-section by a low-vacuum scanning electron microscope ("S-3400N type scanning electron microscope," manufactured by Hitachi High-Tech Science Systems Corp.). Here, the number of cells analyzed was about 10 to 20. Similarly, the minimum cell diameter (μm) and the maximum cell diameter (μm) of the foamed sheet were determined.

(The Apparent Density)

A foamed body (foamed sheet) is punched out with a punching knife of 100 mm×100 mm, and the size of the punched-out sample is measured. Further the thickness is measured by a ¹⁄₁₀₀ dial gage having a diameter (φ) of its measuring terminal of 20 mm. The volume of the foamed body was calculated from these values.

Then, the weight of the foamed body is measured by an even balance whose minimum division is not less than 0.01 g. The apparent density (g/cm$^3$) of the foamed body was calculated from these values.

(The Compression Recovery Test)

The foamed bodies (foamed sheets) (sample size: 50 mm×50 mm) obtained in the Examples and the Comparative Example were each laminated to a thickness of about 1 mm to thereby make a test piece. By using this test piece, the above-mentioned compression recovery test was carried out. The values of the compression recovery 10 min after the compression release, and 24 hours thereafter are shown in Table 2.

(The Repeated Impact Absorption Test)

For the foamed sheets (sample size: 20 mm×20 mm) obtained in the Examples and the Comparative Example, the repeated impact absorption test was carried out. The repeated impact absorption was determined by the expression described before, by using the above-mentioned pendulum impact tester (impact testing apparatus), carrying out impact tests five times in total within 10 sec on one test piece under the conditions of a weight of the impactor of 96 g, a swing-up angle of 47° and 23° C., and measuring an initial impact absorption rate (impact absorption rate of the first impact test) S1 (%) and an impact absorption rate after the five impact tests (impact absorption rate of the fifth impact test) S5 (%).

Further by dividing the initial impact absorption rate (%) by the thickness (μm) of the foamed sheet, an impact absorption rate R per unit thickness was determined.

As shown in Table 2, in the foamed sheets of the Examples, their thickness recovered by not less than 90% 10 min after the compression release, and recovered by not less than 95% 24 hours thereafter. By contrast, in the foamed sheet of the Comparative Example, which contained no silicone-based compound, the recovery after the 10 min was as slow as not more than 70%, and even after the 24 hours, was about 93%.

Further the foamed sheets of the Examples, even if being subjected to repeated impacts, held an impact absorption of not less than 80% as compared with the initial impact absorption; however, the impact absorption rate of the Comparative Example was less than 70%.

ratuses such as liquid crystal displays, electroluminescence displays and plasma displays, display members, such as touch panels, installed on mobile communication apparatuses such as so-called "cellular phones," "smartphones" and "personal digital assistants," cameras and lenses (particularly small-size cameras and lenses). The electric or electronic device according to the present invention uses the foamed sheet according to the present invention. Such an electric or electronic device includes, for example, an electric or electronic device having a display member, and having a structure in which the foamed sheet is interposed between a housing of the electric or electronic device and the display member. Examples of the electric or electronic device include mobile communication apparatuses such as so-called "cellular phones," "smartphones" and "personal digital assistants."

TABLE 1

|  |  | Em the number of parts blended | Silicone-based Compound the number of parts blended (type) | Surfactant (Foaming Agent) the number of parts blended | Crosslinking Agent the number of parts blended | Thickener the number of parts blended | Rust Preventive the number of parts blended |
|---|---|---|---|---|---|---|---|
| Example | 1 | 100 | 1 (A) | 3 | 0.35 | 0.8 | 1 |
|  | 2 | 100 | 0.25 (A) | 3 | 0.35 | 0.8 | 1 |
|  | 3 | 100 | 1 (B) | 3 | 0.35 | 0.8 | 1 |
|  | 4 | 100 | 1 (C) | 3 | 0.35 | 0.8 | 1 |
| Comparative Example | 1 | 100 | 0 | 3 | 0.35 | 0.8 | 1 |

TABLE 2

|  |  | Thickness (μm) | Average Cell Diameter (μm) | Apparent Density (g/cm$^3$) | Compression Recovery (10 min later) (%) | Compression Recovery (24 hours later) (%) | Impact Absorption Rate (Initial) S1 (%) | S1/ Thickness (%/μm) | Impact Absorption Rate (Fifth Impact Test) S5 (%) | (S5/S1) × 100 (%) |
|---|---|---|---|---|---|---|---|---|---|---|
| Example | 1 | 130 | 36 | 0.37 | 94.8 | 99.0 | 16.1 | 0.12 | 16.2 | 100 |
|  | 2 | 130 | 47 | 0.27 | 94.6 | 98.9 | 16.6 | 0.13 | 15.6 | 94 |
|  | 3 | 120 | 41 | 0.39 | 96.0 | 100 | 11.3 | 0.09 | 10.0 | 88 |
|  | 4 | 130 | 47 | 0.34 | 92.6 | 96.8 | 12.7 | 0.10 | 10.8 | 85 |
| Comparative Example | 1 | 130 | 63 | 0.31 | 65.3 | 92.9 | 15.7 | 0.12 | 9.9 | 63 |

INDUSTRIAL APPLICABILITY

The foamed sheet according to the present invention is excellent in recovery after being compressed, and even if being subjected to repeated impacts, hardly decreases in the impact absorption. Hence, for example, in electric or electronic devices, the foamed sheet is useful as a member, particularly an impact absorption sheet, for electric or electronic devices to be used when various types of members or components (for example, optical members) are attached (installed) on predetermined sites (for example, housings). Examples of optical members attachable (installable) by utilizing the foamed sheet according to the present invention include image display members (particularly small-size image display members) installed on image display appa-

REFERENCE SIGNS LIST

1 PENDULUM IMPACT TESTER (IMPACT TESTING APPARATUS)
2 TEST PIECE (FOAMED SHEET)
3 HOLDING MEMBER
4 IMPACT APPLYING MEMBER
5 PRESSURE SENSOR
11 FIXING JIG
12 PRESSING JIG
16 PRESSURE ADJUSTING MEANS
20 SUPPORT COLUMN
21 ARM
22 ONE END OF SUPPORT ROD (SHAFT)
23 SUPPORT ROD (SHAFT)

24 IMPACTOR
25 ELECTROMAGNET
28 SUPPORT PLATE
a SWING-UP ANGLE
30 METAL PLATE
31 TEST PIECE (FOAMED SHEET)
32 SPACER
33 CLIP

The invention claimed is:

1. A foamed sheet, comprising a foamed body formed of a resin composition comprising:
    a thermoplastic resin a and a silicone-based compound b having not more than 2,000 siloxane bonds,
    wherein the thermoplastic resin a is at least one selected from the group consisting of acrylic polymers, rubbers, and ethylene-vinyl acetate copolymers,
    wherein the resin composition does not include an urethanic polymer,
    wherein the silicone-based compound b is an unmodified silicone oil,
    wherein the acrylic polymer is formed from 2 to 30% by weight of a monomer whose homopolymer has a glass transition temperature of not less than −10° C. and 70 to 98% by weight of a monomer whose homopolymer has a glass transition temperature of less than −10° C.,
    wherein the foamed body has an apparent density of 0.21 to 0.7 g/cm³, and an average cell diameter of 15 to 150 μm,
    wherein a ratio of the average cell diameter to a thickness of the foamed body is in the range of 0.2 to 0.9,
    wherein the foamed body has a content of the silicone-based compound b of 0.01 to 5 parts by weight in terms of nonvolatile content, with respect to 100 parts by weight of the thermoplastic resin a in the foamed body, and
    wherein the foamed sheet has a value R of not less than 0.08, the value R being obtained by dividing an impact absorption rate (%) defined by the following expression by a thickness (μm) of the foamed sheet, in an impact absorption test (a weight of an impactor: 96 g, a swing-up angle: 47°) using a pendulum impact tester:

$$\text{an impact absorption rate (\%)} = \{(F_0 - F_1)/F_0\} \times 100$$

wherein $F_0$ is an impact force when the impactor is made to collide with a support plate alone; and $F_1$ is an impact force when the impactor is made to collide with the support plate of a structural body composed of the support plate and the foamed sheet.

2. The foamed sheet according to claim 1, wherein the foamed sheet has a thickness of 30 to 500 μm.

3. The foamed sheet according to claim 1, wherein the foamed body is formed through step A of mechanically foaming an emulsion resin composition.

4. The foamed sheet according to claim 3, wherein the foamed body is formed further through step B of coating a base material with the mechanically foamed emulsion resin composition followed by drying.

5. The foamed sheet according to claim 4, wherein step B comprises preliminary drying step B1 of drying the bubble-containing emulsion resin composition applied on the base material at not less than 50° C. and less than 125° C., and regular drying step B2 of thereafter further drying the resultant at not less than 125° C. and not more than 200° C.

6. The foamed sheet according to claim 1, wherein the number of the siloxane bonds in the silicone-based compound b having not more than 2,000 siloxane bonds is not more than 1,000.

7. The foamed sheet according to claim 1, wherein the foamed body has a content of the silicone-based compound b of 0.05 to 4 parts by weight in terms of nonvolatile content, with respect to 100 parts by weight of the thermoplastic resin a in the foamed body.

8. The foamed sheet according to claim 7, wherein the foamed body has a content of the silicone-based compound b of 0.1 to 3 parts by weight in terms of nonvolatile content, with respect to 100 parts by weight of the thermoplastic resin a in the foamed body.

9. The foamed sheet according to claim 1, wherein a foamed body has an apparent density of 0.21 to 0.6 g/cm³.

10. The foamed sheet according to claim 9, wherein a foamed body has an apparent density of 0.22 to 0.5 g/cm³.

11. The foamed sheet according to claim 1, wherein the foamed sheet has a pressure-sensitive adhesive layer on one face or both faces of the foamed body.

12. The foamed sheet according to claim 1, being used as an impact absorption sheet for an electric or electronic device.

13. An electric or electronic device, using a foamed sheet according to claim 1.

14. An electric or electronic device comprising a display member, a housing, and the foamed sheet according to claim 1 interposed between the housing of the electric or electronic device and the display member.

15. The foamed sheet according to claim 1, wherein a cell structure of the foamed body is an open cell structure or a semi-open semi-closed cell structure.

16. The foamed sheet according to claim 1, wherein the foamed body comprises a fatty acid ammonium-based surfactant.

17. The foamed sheet according to claim 1, wherein the foamed body comprises an oxazoline-based crosslinking agent.

18. The foamed sheet according to claim 1, wherein the foamed body comprises an azole ring-containing compound as a rust preventative.

* * * * *